United States Patent [19]
Fischer

[11] 4,103,709
[45] Aug. 1, 1978

[54] SPOUT TUBE ASSEMBLY

[75] Inventor: Frank S. Fischer, Lorain, Ohio

[73] Assignee: Stanadyne, Inc., Windsor, Conn.

[21] Appl. No.: 722,661

[22] Filed: Sep. 13, 1976

[51] Int. Cl.² .............................................. E03C 1/04
[52] U.S. Cl. .................................... 137/615; 137/359;
137/625.17; 137/801
[58] Field of Search .................... 4/191, 192; 137/359,
137/375, 625.17, 801, 615; 285/8, 174, 238

[56] References Cited

U.S. PATENT DOCUMENTS

| | | | |
|---|---|---|---|
| 2,781,786 | 2/1957 | Young | 137/375 X |
| 3,590,876 | 7/1971 | Young | 137/801 |
| 3,807,453 | 4/1974 | Dom et al. | 137/359 X |
| 3,871,406 | 3/1975 | Anderson | 137/801 |
| 4,026,328 | 5/1977 | Nelson | 137/801 |

FOREIGN PATENT DOCUMENTS

| | | | |
|---|---|---|---|
| 2,331,000 | 1/1975 | Fed. Rep. of Germany | 137/801 |
| 1,277,202 | 6/1972 | United Kingdom | 137/801 |

*Primary Examiner*—Gerald A. Michalsky
*Attorney, Agent, or Firm*—Kinzer, Plyer, Dorn & McEachran

[57] ABSTRACT

A faucet spout includes a non-metallic hub and a metallic spout cover having a body portion surrounding the hub and an integral spout portion. A non-metallic spout tube is positioned inside of the spout portion and in turn has a sealed fluid connection with the interior of the hub for communication with the valve positioned therein.

8 Claims, 8 Drawing Figures

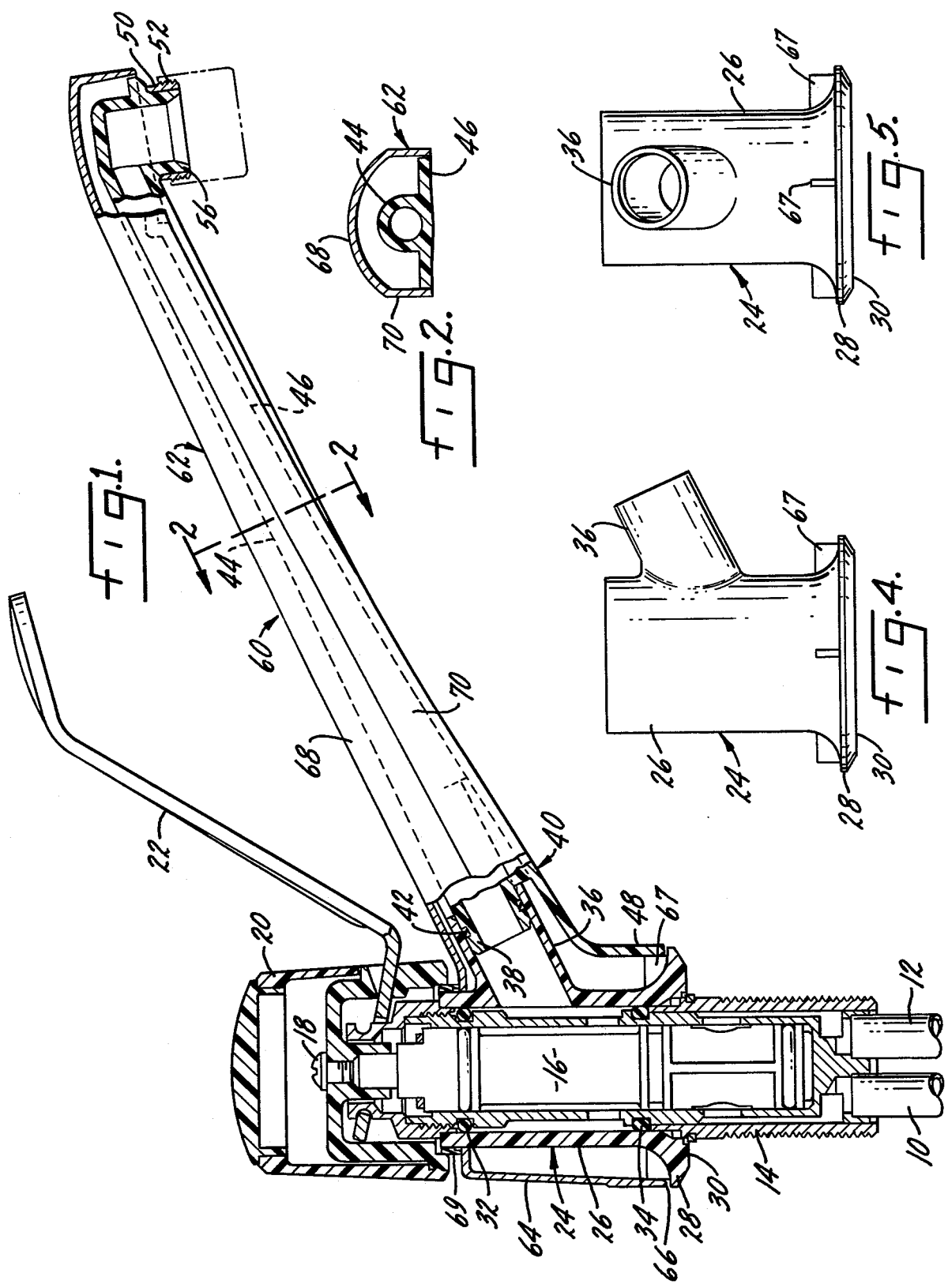

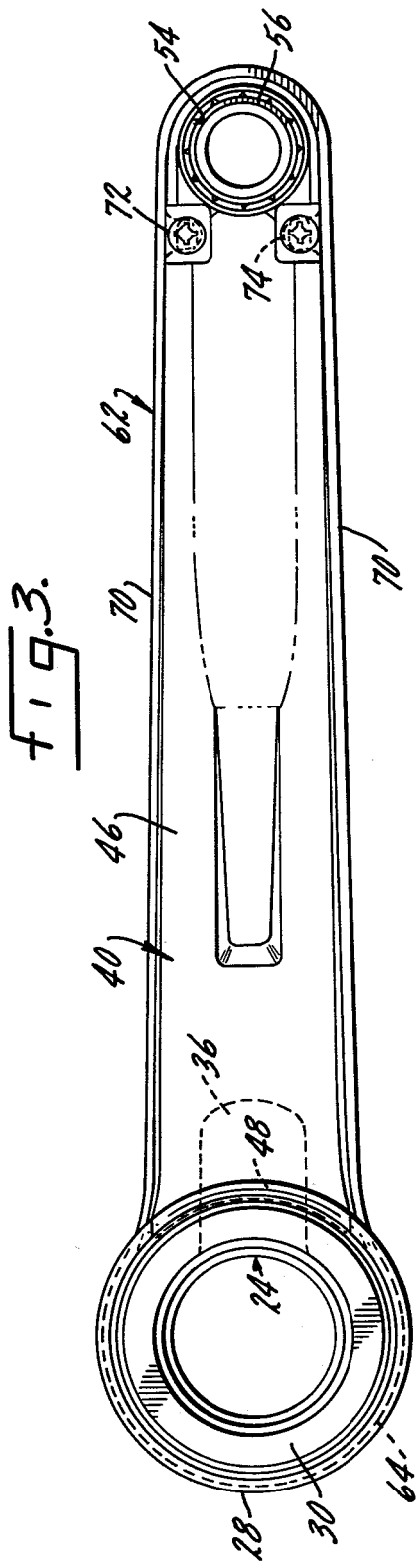
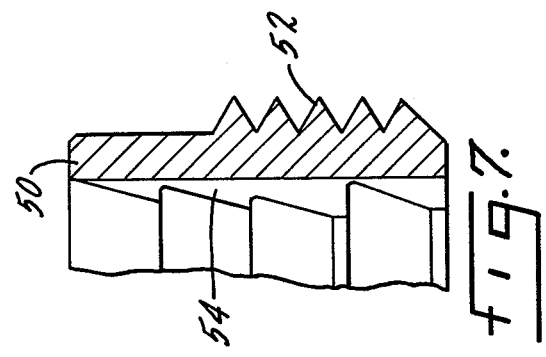
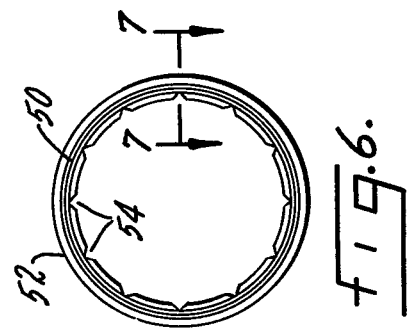
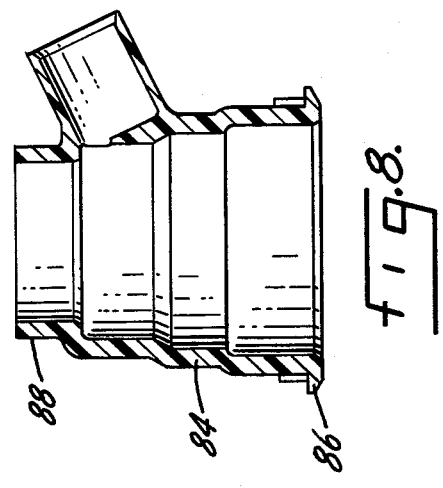

SPOUT TUBE ASSEMBLY

SUMMARY OF THE INVENTION

The present invention relates to water faucet spouts and in particular to a spout construction utilizing a metallic outer shell and separate non-metallic water conduit means within the shell.

A primary purpose of the invention is a simply constructed reliably operable spout construction providing non-metallic water passages.

Another purpose is a spout construction of the type described utilizing a metallic outer shell and plastic parts positioned within the shell for economy in manufacture and assembly of the spout.

Another purpose is a spout construction in which the outer shell may either be metal or a non-metallic material with a metal plating or coating on the exterior thereof.

Another purpose is a spout construction which may be utilized with a variety of different faucet valves.

Other purposes will appear in the ensuing specification, drawings and claims.

BRIEF DESCRIPTION OF THE DRAWINGS

The invention is illustrated diagrammatically in the following drawings wherein:

FIG. 1 is a partial axial section through a faucet construction of the type described, FIG. 2 is a section along plane 2—2 of FIG. 1, FIG. 3 is a bottom view of the spout assembly, FIG. 4 is a side view of the hub, FIG. 5 is a front view of the hub, FIG. 6 is an enlarged bottom view of the spout tip, FIG. 7 is an enlarged section along plane 7—7 of FIG. 6, and FIG. 8 is an axial section of a modified form of hub.

DESCRIPTION OF THE PREFERRED EMBODIMENT

Looking specifically at FIG. 1, hot and cold water inlet conduits are indicated at 10 and 12 and are connected to a faucet housing 14 at the lower end thereof. Positioned within housing 14 is a faucet valve, indicated generally at 16, which may for example be of the type shown in U.S. Pat. Re. No. 25,920. The invention should not be limited to use with a valve structure of the type shown in said patent as the described spout construction has application with any type of single lever mixing valve in which there are hot and cold water inlets for the valve and a water discharge for connection with an attached spout. In some instances there may be no mixing valve structure within the spout construction, as the valve may be operated from a remote location. What is important is the specific spout construction and not whether it is used with a mixing valve within the body portion of the spout, with a mixing valve at a remote location, or in a construction having independent hot and cold water valves connected by conduit to a central spout.

The mixing valve 16 has its operating stem connected by a screw 18 to a cap 20. A lever 22 functions to rotate and reciprocate the stem within mixing valve 16 to control the flow of hot and cold water through the spout.

A non-metallic, preferably plastic hub, indicated generally at 24, has a main cylindrical portion 26 and an outwardly-flared bottom flange 28. The bottom surface 30 of flange 28 may be slightly spaced from the conventional escutcheon plate positioned on top of the sink. This spacing is necessary to permit easy rotation of the spout construction relative to the sink. A pair of spaced seal rings 32 and 34 seal the inside surface of hub 24 with the mixing valve positioned therein.

Hub 24 has an integral tubular projection which telescopically receives a tubular end 38 of a non-metallic, preferably plastic, spout tube 40. A seal ring 42 is positioned within an exterior groove in tubular end 38 and forms a seal with the inside surface of tubular projection 36. Tubular projection 36 is in turn in communication with the interior of the hub and will conventionally pass water from the mixing valve discharge openings to the spout.

Spout tube 40 includes a generally round tube section 44 (FIG. 2) and a generally flat bottom cover section 46. Cover section 46 has a downwardly curved portion 48 which, together with the cover section, is effective to close the bottom opening in the spout cover, as described hereinafter. A round waterway is desirable as it takes higher water pressures.

At the discharge end of spout 40 is mounted spout tip 50 (FIG. 7) having an exterior threaded surface 52 for use in mounting a conventional aerator. Preferably the spout tip is metallic and has a series of internal axial grooves 54 which assist in attaching the metal spout tip upon a non-metallic tubular discharge portion 56 of spout tube 40.

A spout cover, which is preferably formed of a suitable metal, or may in some instances be plastic with metal plating, is indicated generally at 60 and includes a spout portion 62 and a body portion 64. Spout cover portion 62 has a curved top 68, sides 70 and an open bottom. Body portion 64 has an open area co-extensive with the open bottom of cover portion 62, with the spout tube section 46 and curved portion 48 forming the closure therefor.

Body portion 64 is slightly tapered and has a lower surface 66 which seats upon upwardly-extending supports 67 integral with flange 28. A ring 69, which may be sonically attached to hub 24 after the cover is positioned on the hub, bears against the top of cover portion 64. The discharge end of the spout tube is fastened by means of screws or the like 72 and threaded bosses 74 formed integrally with the spout cover. Thus, the entire structure, including the hub and spout tube, are securely fastened to the cover.

FIG. 8 shows a modified form of the invention in which the spout hub, rather than being cylindrical, as particularly shown in FIG. 1, has a series of cylinders of different diameter. The construction of FIG. 8 is particularly designed to accomodate a valve arrangement utilizing a diverter which will be positioned about the exterior of the mixing valve. Hub 84 of FIG. 8 has a bottom flange 86 functioning in the same manner as flange 28. The portions of varying diameter gradually decrease toward the upper end 88 of hub 84 which, as shown in FIG. 1, will partially extend through an opening in the spout cover. Other than accomodating a mixing valve with an exterior diverter, the structure of FIG. 8 will function in all respects as the structure of FIGS. 1–3.

The present invention not only provides an economical spout construction by eliminating substantial areas of expensive brass, zinc or the like, but also provides an all plastic waterway substantially reducing the corrosive effects of hard water on the spout water passages.

The interior portions of the spout are formed of plastic or the like and are formed in two separate sections which may be easily fastened, one to the other, and attached to the metal spout cover. The water passages within the spout are completely sealed, preventing leakage from any point within the overall construction.

Whereas the preferred form of the invention has been shown and described herein, it should be realized that there may be many modifications, substitutions and alterations thereto.

The embodiments of the invention in which an exclusive property or privilege is claimd are as follows:

1. A faucet spout including a non-metallic hub having a lower outwardly extending integral flange and an integral tubular spout projection in communication with the interior of said hub, valve means positioned within said hub, a spout cover having a metallic outer surface, said spout cover having a body portion surrounding said hub and extending adjacent but slightly spaced from said hub flange, a spout portion integral with said spout cover and extending outwardly therefrom, a spout tube positioned within said spout portion and terminating in a discharge opening adjacent one end thereof, said spout tube being telescopically engaged with said spout projection, said spout cover portion being in the form of a shell, having sides, a top and an open bottom, said spout tube having a tubular section integral with a wall portion, which wall portion forms a bottom closure for said shell, spaced support members integral with and extending outwardly from said flange for support at one end of said cover body portion, and a ring attached to said hub and bearing against the opposite end of said cover body portion, said hub and spout covers being pivotally movable, as a unit, about said valve means.

2. The structure of claim 1 further characterized by and including a seal ring positioned at the telescopic engagement of said tubular projection and spout tube and forming a seal therebetween.

3. The structure of claim 2 further characterized in that said spout tube has a portion extending telescopically within said hub tubular projection.

4. The structure of claim 1 further characterized by and including fastening means for attaching said spout tube to said spout portion.

5. The structure of claim 1 further characterized by and including a metallic spout tip attached to said spout tube discharge opening.

6. The structure of claim 5 further characterized in that an interior surface of said spout tip has a plurality of generally equally spaced axially extending grooves.

7. The structure of claim 1 further characterized in that said hub and spout tube are non-metallic and said spout cover is metallic.

8. The structure of claim 1 further characterized in that said spout tube has a generally round cross section.

* * * * *